Figures 4, 5, 6:
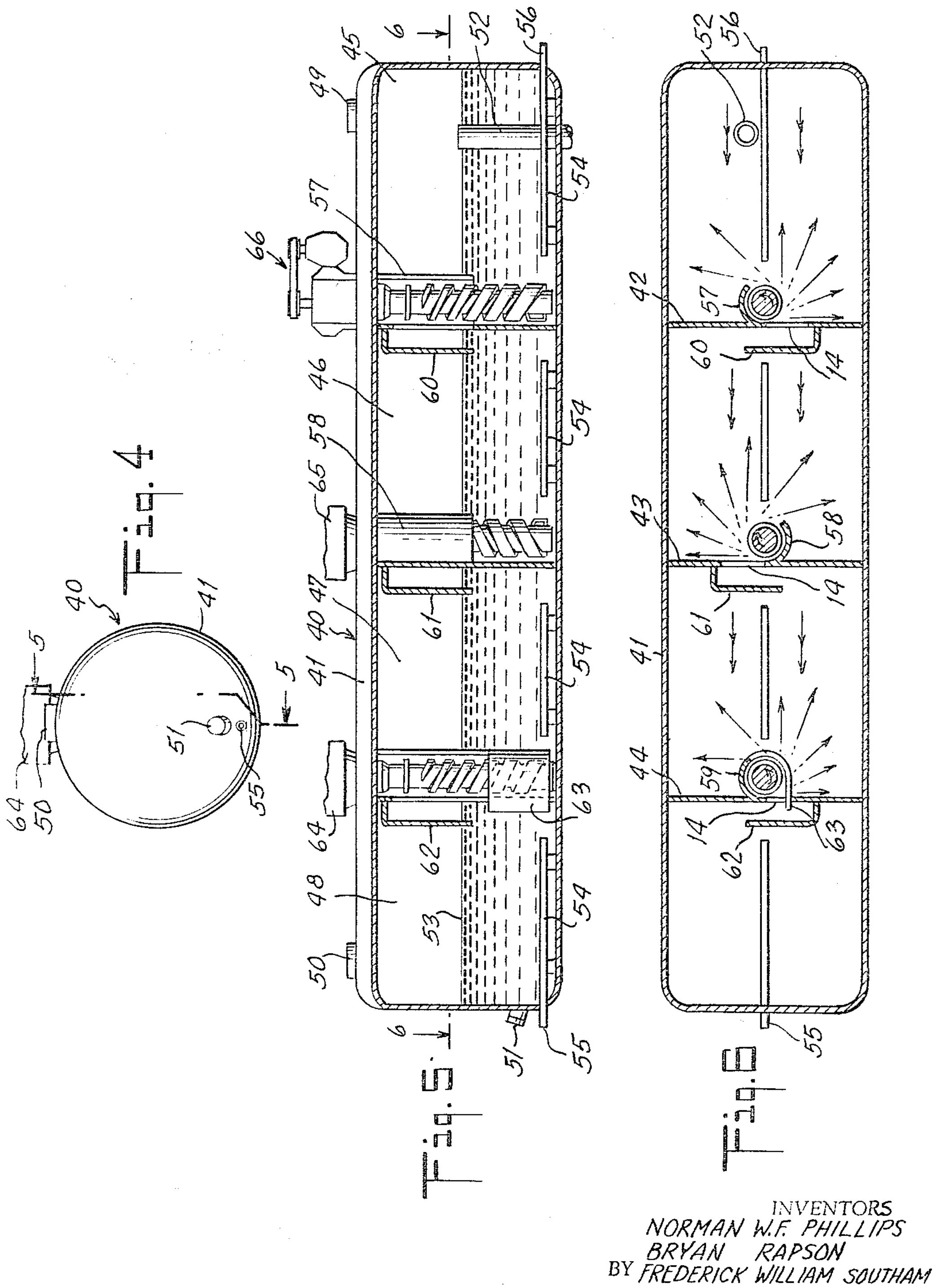

FIG. 1
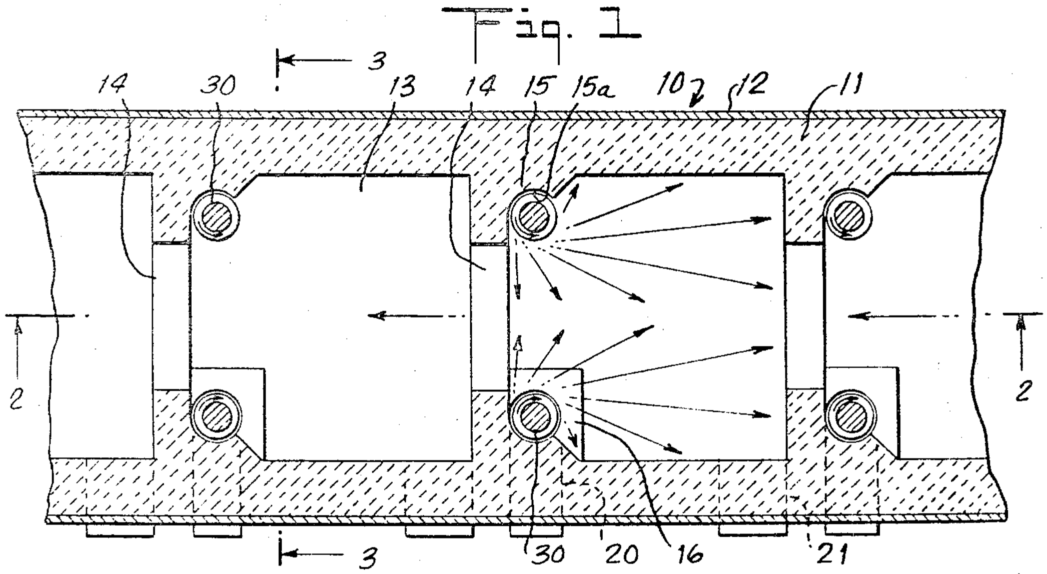
FIG. 2
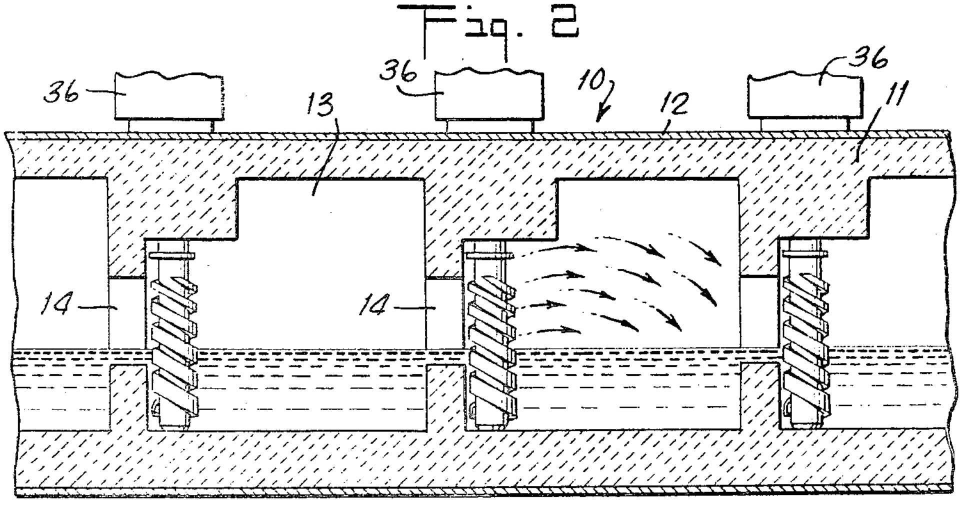
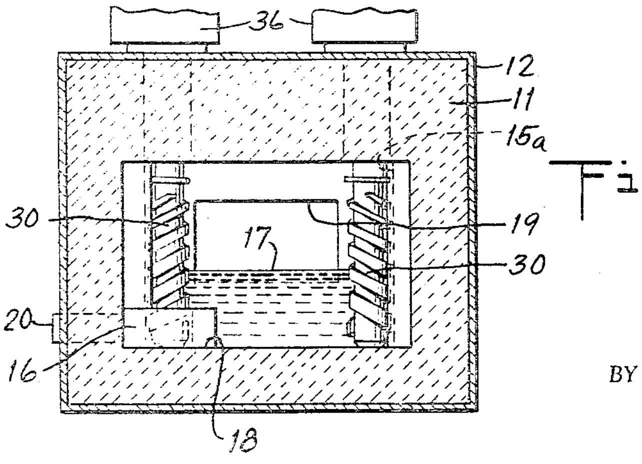
FIG. 3
INVENTORS
NORMAN W. F. PHILLIPS
BRYAN RAPSON
BY FREDERICK WILLIAM SOUTHAM
Robert S. Dunham
ATTORNEY

INVENTORS
NORMAN W.F. PHILLIPS
BRYAN RAPSON
BY FREDERICK WILLIAM SOUTHAM

Robert S. Dunham
ATTORNEY

GAS-LIQUID CONTACT APPARATUS FOR ALUMINUM REFINING
BY THE SUBHALIDE DISTILLATION PROCESS

Filed Oct. 30, 1964 3 Sheets-Sheet 3

INVENTORS
NORMAN W.F. PHILLIPS
BRYAN RAPSON
FREDERICK WILLIAM SOUTHAM
BY Robert S. Dunham
ATTORNEY United States Patent Office 3,311,363
Patented Mar. 28, 1967

3,311,363

GAS-LIQUID CONTACT APPARATUS FOR ALUMINUM REFINING BY THE SUBHALIDE DISTILLATION PROCESS

Norman W. F. Phillips, Bryan Rapson, and Frederick William Southam, all of Arvida, Quebec, Canada, assignors to Aluminium Laboratories Limited, Montreal, Quebec, Canada, a corporation of Canada Filed Oct. 30, 1964, Ser. No. 407,760
19 Claims. (Cl. 266—34)

This invention relates to the intimate admixing and contacting of a liquid with a gas, and more particularly relates to apparatus adapted to achieve heat transfer between a liquid and a gas or absorption of the gas into the liquid by intimately contacting a spray of the liquid with a stream of the gas.

In many processing situations a molten metal or salt must be intimately contacted with a stream of gas either for the purpose of cooling the gas or liquid with the other, or for absorbing the gas into the liquid. The problem common to these situations is the need to achieve a very large area of contact between liquid and gas in a relatively compact apparatus. A common form of solution to this classic problem has been to spray the liquid, generally by mechanical agitation, into the vapor space containing the gas. The problem with prior art apparatus designed to so spray the liquid has been that a relatively complete spray has not, for one reason or another, been attained in the gas space. Particularly where the process is a continuous one, that is, where the gas is continuously supplied and withdrawn, it is most important for the spraying apparatus to be capable of filling the entire vapor space with spray of a high density in order that all the gas be contacted.

In addition not all directions of spray, aside from the density problem just discussed, are equally effective. For instance, concurrent liquid spray and gas flow are relatively inefficient for either gas absorption or heat transfer, for the reason that the relative velocity of liquid and gas molecules is low, thus affording relatively few contacts for each said molecule. On the other hand, counter-current flow of spray and gas is relatively efficient because of the concomitant higher number of collisions between, for example, a given gas molecule with liquid molecules. Styles of flow intermediate concurrent and counter-current are also intermediate in efficiency.

While, as aforesaid, the inventive principles herein disclosed are of utility generally in contacting liquids and gases in the manner and for the purposes already discussed, the apparatus finds highly advantageous use in contacting molten metal or salts with gases in a metal refining process. This process is the so-called subhalide distillation process for the refining of aluminum metal, wherein gaseous normal aluminum halide (especially aluminum chloride, or alternatively aluminum bromide) is employed to convert aluminum metal, from an impure body thereof, to gaseous aluminum monohalide (e.g., monochloride or monobromide) which is thereafter decomposed to yield purified metal and a restored quantity of the normal halide. This process, and typical apparatus for effectuating it, is taught in U.S. Patents 2,914,398 and 2,937,082, both to A. H. Johnston et al.

In a particularly effective form of this subhalide process, the normal aluminum halide (e.g., aluminum trichloride), preferably preheated, is brought in gaseous or vapor state into contact with impure or contaminated aluminum-bearing material, for the above reaction which converts aluminum of such material into the gaseous subhalide state, e.g., the monochloride, such reaction being effected at elevated temperature in a suitable chamber or furnace or equivalent device, conveniently called a converter. The gaseous subhalide, usually also carrying a quantity of unreacted normal halide, is then conducted to a vessel or device serving as a decomposer (sometimes also called a condenser), where at a lower temperature a reverse chemical reaction occurs, involving the dissociation of the subhalide to yield relatively pure aluminum metal which is collected as the product. This reverse reaction also yields the normal halide, thus restoring the latter to the gas stream, so that the gaseous discharge from the decomposer consists essentially, or for the most part, of such normal halide, made up of the previously unreacted quantity and the restored quantity.

One advantageous form of decomposer will comprise a bath of molten aluminum which is sprayed into the aforesaid subhalide and normal halide gas stream, so as to lower the temperature of the gas stream, thereby causing decomposition of the subhalide to the normal halide with deposition of the extra aluminum freed thereby, into the aluminum bath.

As is fully discussed in the aforesaid patents, it is advantageous at another stage of the subject subhalide process for the refining of aluminum, to lead part or all of the normal halide gas into what is termed an absorber apparatus or stage, for the purpose of absorbing the normal halide gas into a molten salt bath therein, thus separating the normal halide gas from so-called non-condensable or permanent gases (non-desirable by-product gases) which have built up in the system. The normal halide gas may then be evaporated separately from the bath to complete the said separation. One highly advantageous form of absorber, will effectuate absorption of normal halide gas into the molten salt by spraying the latter into a vapor space containing the former.

It is thus clear that at two stages in the so-called subhalide process for the refining of aluminum, namely the decomposer stage and the absorber stage, apparatus adapted to intimately admix a molten material with a gas is required, in the one case chiefly for heat transfer from the gas to the liquid, and in the other case chiefly for surface absorption contact between the liquid and the gas. These two purposes are shared by the great majority of other processing situations wherein a liquid and a gas must be presented to each other in such a manner as to afford a very great contact area and a very great uniformity of contact. Consequently it is contemplated throughout the discussion contained hereinbelow that the inventive principles, while illustrated by and highly advantageous in the so-called subhalide process for the refining of aluminum, will have applicability to other similar processing situations, and no restriction to the presently described process is intended or should be inferred.

It is accordingly a principal object of the present invention to provide a liquid-gas admixing and contact apparatus that achieves a very great contact area and a very uniform contact within a relatively compact space.

Another object of the invention is to provide such an apparatus wherein a liquid spray is distributed within a gas space with a highly uniform density.

Another object of the invention is to provide such an apparatus wherein a large proportion of the spray contacts the gas in counter-current flow so as to achieve a higher number of contacts between individual gas and liquid molecules.

Another object of the invention is to provide a superior decomposer apparatus for use with the subhalide process for the refining of aluminum.

Another object of the invention is to provide a superior condenser or absorber apparatus for use in the subhalide process for the refining of aluminum.

Figure 7:
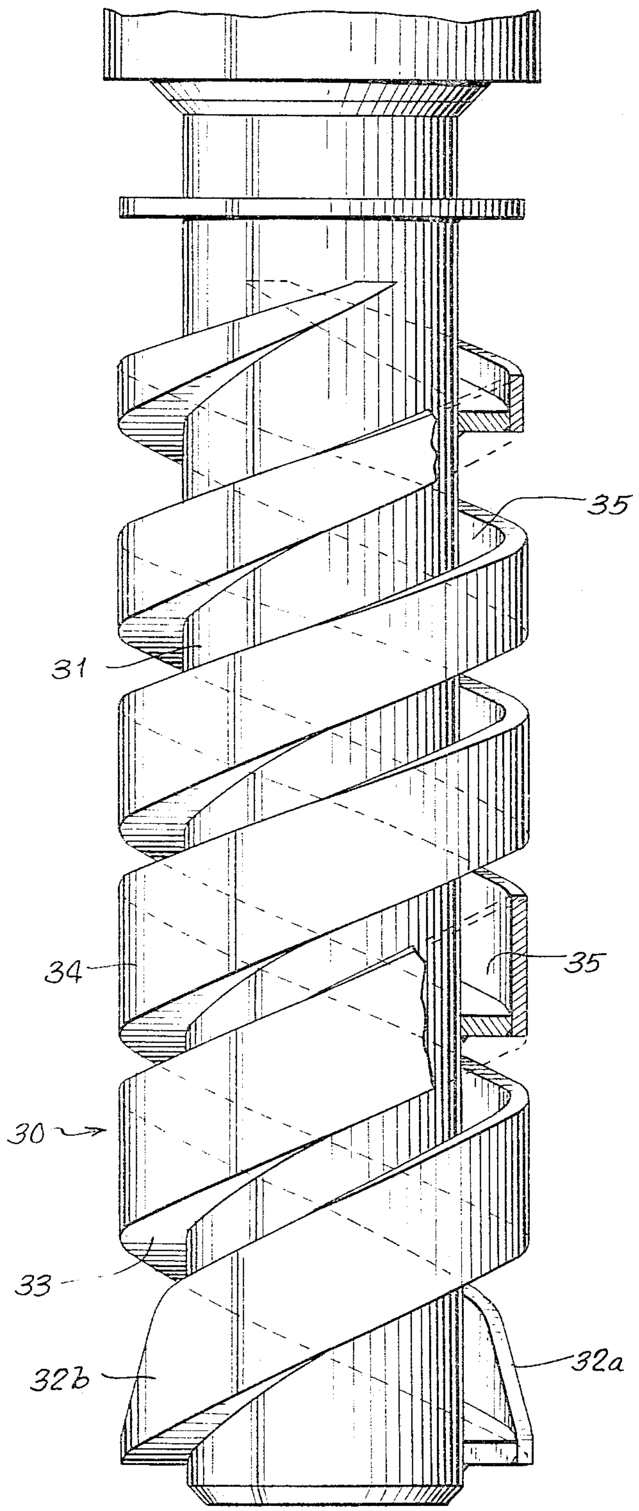

These and other objects and advantages of the invention will be fully understood upon examination of the detailed description of two illustrative embodiments of the inventive principles contained hereinbelow, when taken with the drawings in which like reference characters denote like parts in all views thereof, and in which:

FIGURE 1 is a sectioned plan view of a portion of a first embodiment of an apparatus constructed according to the invention and having a plurality of stages, FIGURE 2 is a section view of the unsectioned apparatus of FIGURE 1 viewed along line 2—2 therein, FIGURE 3 is a section view of the unsectioned apparatus of FIGURE 1 viewed along line 3—3 therein, FIGURE 4 is an end view of a second embodiment of an apparatus according to the invention, FIGURE 5 is a longitudinal section view of the apparatus of FIGURE 4 viewed along line 5—5 therein, FIGURE 6 is a longitudinal section view of the unsectioned apparatus of FIGURE 5 viewed along line 6—6 therein, and FIGURE 7 is an enlarged view of the screw-lift of FIGURES 1–3, 5 and 6, showing details thereof.

Referring now to the drawings, and particularly FIGURES 1 through 3 thereof, there is shown a decomposer apparatus for use in the subhalide process for the refining of aluminum wherein are embodied in each of the multiple stages thereof the principles of the present invention. A decomposer indicated generally at 10 comprises a refractory material structure 11 preferably but not necessarily manufactured from refractory bricks and having a metallic outer shell 12.

The interior of decomposer 10 constitutes a plurality of chambers 13, said chambers being serially interconnected by a plurality of passageways 14. The general purpose of decomposer 10 is to contact aluminum monohalide gas at an elevated temperature, with molten aluminum in each of chambers 13, the aluminum monohalide gas traversing the said chambers in serial fashion by means of passageways 14, so that the gas may be cooled by the liquid metal and thus decomposed into aluminum and aluminum trihalide. Within each of chambers 13, in order to effect this general purpose, must be situated means for contacting a great area of the said molten aluminum with the traversing gas, which contains the monohalide, usually in admixture with a substantial proportion of unconverted trihalide. It is known in the prior art to employ splashing or spraying means to effect the said contact.

The present invention presents improved splashing and spraying means within each of chambers 13 that attains a very large contact area between the molten aluminum and the aluminum monohalide gas, and that very efficiently, completely, and uniformly cools the traversing aluminum monohalide gas so as to recover a maximum amount of aluminum therefrom in a relatively compact apparatus. The apparatus has other unique advantages, that will be explained hereinbelow.

These improved splashing and spraying means comprise helical screw members indicated generally at 30, and shown in detail in FIGURE 7. Referring to FIGURE 7, it will be seen that the body of screw-lift 30 comprises a central torque shaft 31, with a pair of preferably integrally formed helical channels **32*a* and 32*b* concentric therewith. Channels 32*a* and 32*b* form a double helix. Channels 32*a* and 32*b* each have a bottom wall 33 and a side wall 34, which cooperate with the wall of shaft 31 to define the helical channel opening 35. The height of channel side wall 34 decreases with ascending position thereof on shaft 31. The helical channels 32*a* and 32*b* thus present a pair of helical troughs whose capacity decreases with ascent on shaft 31. When shaft 31 is rotated in the clockwise direction, immersed in a liquid, the liquid will rise in the helical channels or troughs 32*a* and 32*b*, and by centrifugal force will be thrown out tangentially into any free-space surrounding the screw-lift 30. The decreasing capacity of troughs or channels 32*a* and 32*b* with ascent is adapted to keep that trough or channel full despite the loss of liquid, so that each brimming trough or channel 32*a* or 32*b* is capable of spinning off centrifugal spray at all axial heights along shaft 31. This effect causes an even spray within the free-space volume as hereinafter explained. The screw-lift 30** may be fabricated in any material compatible with the liquid concerned. When using molten aluminum, the preferred material is graphite.

The invention further contemplates arranging the said screw-lifts 30 so as to be surrounded peripherally and closely with a baffle member, as hereinafter illustrated, which baffle member is so arranged as to direct the aforesaid centrifugal spray in the most efficient directions from the standpoint of contact and free-space splashing density.

Referring now again to the first or decomposer embodiment shown in FIGURES 1–3, the direction of aluminum monohalide gas flow is from right to left in the apparatus as shown, as indicated by the double-headed arrows therein. Accordingly, at the leftmost portion of each chamber 13, immediately adjacent the sides of passageway 14, is a pair of screw-lifts 30. Surrounding each screw-lift 30 for a substantial portion of the periphery thereof, is a baffle portion 15 of refractory wall 11. The baffle portion 15 is shaped with a circular concave portion **15*a* adapted, in the example embodiment shown, to encircle the periphery of screw-lift 30 for about 135° of arc thereof. The said concave portion 15*a* is arranged relative to chamber 13 so that a radius of portion 15*a* at the mid-point of the said 135° of arc points approximately diagonally across chamber 13. The concave portion 15*a* may extend the height of chamber 13, as does the screw-lift 30 nested therein, as is shown in FIGURE 2. It is essential only that the portion 15*a* extend throughout the portion of the chamber constituting the vapor space, that is, above the liquid level 17. The screw-lift 30 fits closely into the concave portion 15*a*, but without touching. Concave portion 15*a* thus confoms closely to a limited arcuate portion of the outline of screw-lift 30, the limits of the arcuate portion being generally defined as extending from a point on screw-lift 30 whose tangent points directly across the opening of passageway 14, to a point whose tangent points in the general direction of the gas inlet to the chamber, that is, the opposite end of the chamber from the end adjacent screw-lifts 30**.

As is best shown in FIGURES 1 and 3, a shroud 16 surrounds one of screw-lifts 30 in each of chambers 13. The shroud 16 preferably extends from appreciably below the molten liquid level 17 of the chamber (i.e., appreciably below the lower portion of passageway 14) completely down to the floor 18 of the chamber 13. Thus all the portion of screw-lift 30 above liquid level 17 is unshrouded by shroud 16, and only a portion (e.g., one-half) of the portion of screw-lift 30 below the liquid level 17 is unshrouded. The shroud 16 is fabricated in a suitably resistant material relative to the nature of the molten liquid contained in chamber 13 in which it is immersed, in the case of molten aluminum, the material consequently is preferably refractory in nature. The shroud 16 is affixed to the refractory walls 11 immediately adjacent screw-lift 30, so that a large portion of the liquid space immediately surrounding the lower portion of that screw-lift 30 is confined within the embrace of shroud 16, and that liquid may of course be exchanged between the shroud-embraced portion of chamber 13 and the main portion of chamber 13.

Leading in through wall 11 adjacent that screw-lift 30 having shroud 16 associated therewith, is entrance passageway 20, shown partially in phantom outline in FIGURES 1 and 3, and partially in full outline therein. This passageway 20 leads from a cooling well (not shown) wherein molten aluminum is by any appropriate technique, cooled in temperature. The cooled molten aluminum is led in via passageway 20 into the portion of chamber 13 embraced by shroud 16. At the far end of chamber 13 from the end containing screw-lifts 30, is a second or outlet passageway 21, also shown partially in phantom and partially in full outline in FIGURE 1. Passageway 21 leads the molten contents of chamber 13 from a depth therein appreciably below the surface thereof, to the aforesaid cooling well for cooling and return to chamber 13 via passageway 20.

The various parts, already described, contained within chamber 13 are arranged in such a manner as to bring about the aforesaid efficiency and completeness of contact between relatively cool molten aluminum and relatively hot traversing aluminum monohalide gas. Specifically the sense of helical channels 32*a* and 32*b* on each of screw-lifts 30 and the sense of rotation of said screw-lifts are chosen to cooperate so as to throw molten metal in the manner or pattern shown particularly by the single-headed arrows in one example chamber 13 in FIGURE 1. That is to say, each shrouded screw-lift 30 in FIGURE 1 may employ right-handed sense helical channels 32*a* and 32*b* (as shown in FIGURE 7) together with a clockwise (looking downward as shown) sense of rotation of screw-lift 30 (as indicated in FIGURE 1), and the uppermost screw-lifts, in FIGURE 1 as shown, may employ a screw-lift 30 having left-handed sense helical channels 32*a* and 32*b* (not shown) in cooperation with a counterclockwise sense of rotation (looking downward in FIGURE 1) of screw-lift 30. Drive means 36 are adapted to power the respective screw-lifts 30 in the appropriate directions.

When the right-handed screw-lift 30 illustrated in FIGURE 7 is rotated in a clockwise fashion liquid is forced up helical channels 32*a* and 32*b*, and when this liquid is raised along shaft 31 above liquid surface 17 in FIGURE 3, centrifugal force on the liquid contained in channel 32 throws it outward tangentially to screw-lift 30. Because of the already described smaller liquid capacity of channel 32 with ascent upon shaft 31, a relatively equal amount of liquid is sprayed tangentially at all vertical elevations of screw-lift 30 above liquid surface 17 within chamber 13, because the channel 32 is brimming at all such levels. The closely conforming (but not touching) circular concave portions 15 of refractory wall 11 prevent such tangential spraying over the aforesaid 135° arc of said screw-lifts 30, thus resulting in tangential spray in the directions shown by the single-headed arrows in one example chamber 13 in FIGURE 1. Moreover, portions 15*a* cause retention of liquid in channels 32 during the 135° of arc, thereby increasing the lifting effect of the screw-lift 30. This also gives better vertical spray distribution. As represented by the single-headed arrows some spray is released tangentially at a point on the periphery of screw-lift 30 just past the end of the aforesaid approximately 135° arc of concave portion 15*a* so that such spray travels laterally across chamber 13 toward the opposed screw-lift 30. The effect created by the opposed spray from the pair of screw-lifts 30 in each chamber 13 is to create a dense curtain of spray across the opening of passageway 14 to the next chamber 13. Spray released at points further removed peripherally from the first mentioned points travels in directions as indicated by the other single-headed arrows in chamber 13 of FIGURE 1, so that progressively released spray travels in a broad arc of directions a great deal of which is nearly or essentially counter-current to the flow of gas indicated by the double-headed arrows. That is to say, the entire interior of chamber 13 is filled with spray whose direction varies from essentially counter-current to the gas flow, to essentially perpendicular to the gas flow. The former extreme is very advantageous for heat transfer purposes, and the latter extreme is very advantageous for creating the aforesaid screen of spray across passageway 14 to insure that all gas leaving chamber 13 has had a full opportunity to contact molten liquid. The directions of spray intermediate and beyond these two senses are calculated to achieve a combination of both effects and to create a general high density of liquid droplets in the entire vapor space traversed by the gase above level 17 of the molten liquid. It will be appreciated that because of the construction and arrangement of the apparatus as already described, the spray droplets are well distributed in the vertical plane as shown in FIGURE 2 as well as in the horizontal plane as shown in FIGURE 1.

The cooler molten liquid returning to chamber 13 via passageway 20 is deposited within the embrace of shroud 16 as aforesaid. The body of liquid within shroud 16 openly communicates with the general body of molten material at the bottom portion thereof as has already been discussed. However the liquid embraced by shroud 16 will at any given moment be appreciably cooler than the liquid within the general body of chamber 13, and it is this cooler liquid which is picked up and sprayed by the shrouded bank of screw-lifts 30. If desired a similar shroud 16 and passageway 20 may be associated with the opposed bank of screw-lifts 30 as well. Whether one said bank of both said banks of screw-lifts 30 is so shrouded, the effect is to present the returning cooler molten metal directly to the gas stream without first admixing it with the general liquid contents of chamber 13. However the flow rates and other parameters of the operation are adjusted so that any sprayed metal, whether from within the shroud 16 or from within the general body of the molten liquid, will be cooler than the traversing gas, so as to cool same for decomposition thereof. An equal amount of molten liquid is withdrawn via passageway 21 to supply the cooling well or other means for depositing the excess heat brought into the melt body by heat exchange with the constant flow of gas, which is highly heated and from which a large amount of heat must be removed to effectuate the exotherimc reaction of decomposition of monochloride.

The arrangement whereby the helical screw-lifts 30 are surrounded along a substantial peripheral portion thereof by concave baffle 15*a*, is directly responsible for the superior efficiency in completeness of heat transfer between the gas and liquid, and the other already recited advantages of the apparatus. Thus the large portion of the sprayed metal which is essentially counter-current to the gas flow together with the curtain of spray which the gas flow must thereafter traverse and the uniform density of spray within the entire traversed vapor space, is the result of the arrangement and form of the recited parts and is responsible for the recited advantages.

In operation the decomposer 10 which forms a first embodiment of the inventive principles functions as follows. A high temperature gas stream containing aluminum monohalide gas is led into a first stage chamber (not shown) and subsequently to succeeding identical stages 13 shown in FIGURE 1. Since the operation in each stage 13 is identical, only entrance into one example chamber 13 and exit therefrom by the aluminum monohalide gas will be described.

Hot aluminum monohalide gas enters through a passageway 14 at the end of chamber 13 furthest from screw-lifts 30 and is met by essentially counter-current relatively cool sprayed molten metal. The gas is somewhat cooled thereby and is somewhat decomposed to yield its aluminum in this portion of chamber 13. As the gas travels further through chamber 13 toward the immediate vicinity of screw-lifts 30 the direction of spray generally changes from counter-current to cross-current and the spray becomes more intense and concentrated. The effect of this latter is to scrub the gas thoroughly and expose all portions thereof to metallic contact. When the gas passes through the opposed spray in the vicinity of screw-lifts 30, it exits via passageway 14 and enters the next chamber 13.

The traverse of the entire chamber is thus a combination of counter-current contact and intense scrubbing with sprayed molten metal so that the temperature of the gas exiting from the same chamber 13 by the passageway 14 adjacent screw-lifts 30 is virtually the same as the temperature of the molten spray or the molten bath therein. Not all of the gas will be decomposed to aluminum and aluminum trihalide within any given chamber 13, although such an effect could be designed into the equipment if a single stage operation was completely necessary. Generally however, the temperature of the molten bath in each of successive chambers 13 will be lower, and consequently the temperature of the gas exiting from the corresponding chambers will also be successively lower. Each chamber is therefore to some extent thermodynamically independent of the others, and in equilibrium with its own particular temperature range of gas flow. Within such a multi-stage operation decomposition will occur in one or more of the successive stages and yield the aluminum values therein, or may occur in all stages because of non-uniformities in gas cooling within the gas flow in any given chamber. In any event the overall effect is to efficiently and effectively contact the molten metal with the traversing gas within one or more stages 13 so as to decompose the aluminum monochloride to aluminum and aluminum trichloride.

The second embodiment of the inventive principles comprising an absorber apparatus for use in the aforesaid subhalide process for the refining of aluminum is shown in FIGURES 4 through 6. It will be remembered that the function of the absorber is to contact aluminum trihalide gas with a molten salt so as to dissolve the gas in the salt for any of several purposes including to separate it from extraneous gases in the system. In any event the dissolved gas may be recaptured for the system by evaporating it from the salt.

The absorber indicated generally at 40, comprises an outer preferably metallic shell 41 of a generally cylindrical form, within which are erected a plurality of partitions 42, 43, and 44, three partitions being shown by way of example. The partitions divide the interior of absorber 40 into four zones indicated generally at 45, 46, 47, and 48. The general scheme is for gaseous aluminum trihalide to enter absorber 40 at gas entrance nozzle 49 at one end of absorber 40 and to exit from gas egress nozzle 50 at the second end of absorber 40, while fresh elevated temperature molten salt is introduced counter-current thereto, that is, at liquid entrance nozzle 51 and withdrawn from liquid egress overflow pipe 52. The absorber 40 is partially filled with a molten salt to approximately the center line thereof, that is approximately to level 53, which level is maintained by the said egress liquid overflow pipe 52. Melt compositions which it is possible to employ are determined by phase diagram, vapor pressure and heat transfer considerations. Although for absorption of aluminum chloride a melt composed of sodium chloride and aluminum chloride is preferred from cost considerations, other melts such as potassium chloride and aluminum chloride would also be suitable.

Along the bottom-most portion of absorber 40, that is approximately at the bottom of the liquid contained therein, are situated heaters 54. One heater may be provided for each of zones 45, 46, 47, and 48 or a single heater traversing all the zones may be supplied. In either event the heater or heaters will terminate externally at 55 and 56 whereby they may be connected to and energized by a source of power (not shown) for providing heat within the liquid body of absorber 40.

In general each of partitions 42, 43, and 44 is provided with a screw-lift 30 entirely similar in construction and principles of operation to that already described above in connection both with screw-lift 30 of FIGURE 7 and the application and operation thereof in accordance with the decomposer 10 in FIGURES 1 through 3. As is perhaps best shown in FIGURE 6, each partition 42, 43, and 44 is associated therewith a curved baffle member 57, 58, and 59 respectively. As is also best shown in FIGURE 6, the screw-lifts 30 are arranged on the center line of absorber 40; consequently each of curved baffle members 57, 58, and 59 is attached to its respective partition at approximately the same center line so that the appropriate close conformity of the concave side of each said baffle member with its respective screw-lift is attained. Specifically partition 42 is arranged so as to have a passageway 14 located entirely or nearly entirely on one side of the center line shown in FIGURE 6, while the curved baffle member 57 extends from that center line to and within the other side of the same said center line. With regard to partition 43 the placing of the passageway 14 and the baffle 58 is reversed from that just described with respect to partition 42. Finally with respect to partition 44 the placing of passageway 14 and curved baffle member 59 are again reversed so that they are opposite to that of partition 43 and the same as that of partition 42.

Thus assuming screw-lifts 30 of absorber 40 having left-handed sense helical channels 32*a* and 32*b*, the screw-lift associated with partition 42 will be operated in the indicated counter-clockwise direction of rotation (looking downward in FIGURE 6), while the screw-lift associated with partition 43 will be operated in a clockwise direction with right-handed channels 32*a* and 32*b*, and the screw-lift associated with partition 44 will be operated in a counter-clockwise rotation with left-handed channels 32*a* and 32*b*. As is shown by the single-headed straight arrows in each of zones 45, 46, and 47 the aforesaid directions of rotation in each case throw a cross-current spray across the opening of pasageway 14 and throw further tangential spray which varies from cross-current to counter-current and beyond. As was already described with respect to decomposer 10 this distribution of spray is very efficient with regard to contacting the molten substance with the traversing gaseous substance.

Screen members 60, 61, and 62 are situated directly behind each passageway 14 in partitions 42, 43, and 44 respectively, for the purpose of diverting traversing gas laterally so as to slow or average the speed with which the entering gas traverses the succeeding zone. Associated with the final partition 44 is a downward extension of curved baffle member 59 which nearly reaches the bottom surface of absorber 40, and which cooperates with a radial extension 63 thereof to form an approximately circular liquid baffle surrounding the screw-lift 30 associated therewith and entirely below the surface 53 of the liquid in absorber 40.

The passageway 14 in partition 44 extends appreciably below the surface 53 of the liquid down to the vicinity encompassed by member 63. Thus the upper portion of passageway 14 lying above liquid surface 53 acts to admit gas from zone 47 to zone 48, while the lower portion of passageway 14 lying below surface 53 acts to cooperate with member 63 and the downward extension of curved baffle member 59 which nearly reaches of screw-lift 30 therethrough to the liquid in zone 48 and return. Since lean (in aluminum trihalide) and relatively cool molten salt is introduced fresh into chamber 48 by liquid entrance nozzle 51 the lower portion of the screw-lift 30 associated with partition 44 acts to mix the contents of zone 48 and to bring some of that contents specifically into zone 47.

The heaters 54 are adjusted to properly tailor the thermodynamics of the molten bath, and the flow from zone 48, to zone 47, to zone 46, and thence finally to zone 45 will be primarily dictated by the rate of flow of molten salt into liquid entrance nozzle 51. However particularly in the liquid entrance zone 48 itself, overflow into the next zone 47 may not produce a smooth flow of relatively uniformly heated molten material, because of the influence or orifice 51 upon the contents of zone 48, and therefore the expedient of means 63 with the downwardly extended passageway 14 and the agitation of the lower portion of screw-lift 30 associated therewith is employed to mix the contents of zone 48 so as to insure relatively uniform heat distribution in the melt. In transfers from zone to zone across succeeding partitions 43 and 42 however, the contents of the respective previous zones 47 and 46 are already of sufficiently uniform temperature so that no further mixing expedient is necessary.

Associated with each screw-lift in absorber 40 is a power means adapted to rotate the associated screw-lift at a desired rate of rotation. In practice it has been found advantageous to employ standard drives 64 and 65 to drive the screw-lifts 30 associated respectively with partitions 44 and 43, while a variable speed drive indicated generally at 66 is employed to drive the screw-lift associated with panel 42. By adjusting the speed of drive 66 a fine control is exercised on the overall absorption process within absorber 40.

In absorber 40, it will now be appreciated, the gaseous flow from gas entrance nozzle 49 to gas egress nozzle 50 is effectuated for the primary purpose of the absorption of the aluminum trichloride in the molten salt bath contained within the absorber, rather than for the primary purpose of heat transfer (and accompanying decomposition) practiced in decomposer 10. Thus in operation, gas containing aluminum trihalide and extraneous gases, at for example 700° C. is introduced into gas entrance nozzle 49 whence it traverses successive passageways 14 interconnecting zones 45, 46, 47, and 48 and thereupon exits substantially devoid of aluminum trihalide content at gas egress nozzle 50. Within this traverse a counter-current flow of molten salt is sprayed in each of chambers 45, 46, and 47 in the counter-current and cross-current fashion already described, in high density throughout the vapor space, so as to afford a high area of liquid to gas contact thus offering opportunity for absorption resulting in a highly efficient apparatus. The molten salt is relatively cool and lean (in aluminum trichloride) when introduced at 51, and after traverse, is relatively hot and rich when withdrawn at 52.

From the two illustrative embodiments described above, that is the decomposer apparatus 10 and the absorber apparatus 40, it will be seen that the arrangement of a helical screw-lift 30 with an appropriate curved baffle member in a liquid containing chamber very effectively contacts the liquid and the gas for either the purpose of heat transfer therebetween or for the purpose of absorption of the gas into the liquid, in a relatively compact space. The counter-current and cross-current arrangement of spray taken with the relatively uniform distribution of spray in the vertical plane is the direct cause of this efficiency. It will thus be clear that apparatus employed for other liquid to gas contacting purposes, where a great contact area must be achieved in a relatively compact contacting volume, will advantageously employ the present inventive principles.

It is also noted that the curved baffle structure closely adjacent the limited arcuate of the screw-lift not only blocks the spray in selected directions but in effect substantially returns, into the helical channel or channels, the liquid which tends to depart in this region. Specifically, it has been found that a given amount of liquids can be raised to a higher point with a given speed of rotation, and distributed as spray in desired directions throughout the exposed elevation of the device, than is possible without the baffle. Stated in another way, a larger proportion of the liquid reaches the top of the screw-lift, thereby intensifying the spray traveling farthest from the screw, for a given rotation speed, it being understood that the height to which liquid may be elevated and sprayed by a screw-lift is governed, within limits, by the speed of rotation.

The screw-lift splashing arrangements of the invention have a further advantage, in contrast to some other types of liquid-gas contact means, in that although a relatively dense and well distributed spray is achieved, the pressure drop along the gas path can be kept very small. Furthermore, in situations such as that of FIGURE 1, where the operation in a decomposer may be accompanied by some tendency to accumulation of solid or other floating particles on the molten metal, i.e. as dross, the described spraying means have an effective tendency to cause movement of the dross, along the metal surface, in a direction toward the gas inlet. Hence the arrangement can be such that the dross is effectively advanced along the apparatus, past the first stage pair of screw-lifts, and to the gas entrance end, where such dross may be removed, e.g. in an appropriate way not in itself part of the present invention.

The screw-lift devices of the invention are also specially adapted for multi-stage splashing systems as illustrated in the drawings, especially in that a plurality of stages of the vertical screw-lifts can be more compactly accommodated, with ample gas and spray space, in contrast to splashing impellers that are disposed at an acute angle to the liquid surface. Likewise in comparison with some prior arrangements involving impellers mounted on a single longitudinal shaft, and thus rotating on a horizontal axis, a large number of stages of splashers can be used, if desired; there is no mechanical limitation of support as is the case where splashing devices must be supported by a single shaft mounted in bearings only at its ends.

As examples of apparatus, screw-lifts constructed in the manner of FIGURE 7, having an outside diameter of the helical channel portions of about 12 inches and a central shaft portion 31 of a diameter of 8 inches to 8½ inches, and used with 135° baffles within about ½ inch of the periphery, have been found very satisfactory for the desired contact and mixing with large volumes of gas, with reasonable and safe speeds of rotation. Thus in the case of a decomposer, such screw-lifts of dense graphite, having a height above the liquid surface of about 21 inches and with double helical channels having their entrance openings about 14 inches below the surface, rotational speeds of 600 to 700 r.p.m. have provided a satisfactorily distributed, full spray of molten aluminum, for efficient heat absorption from the gas and decomposition of aluminum monochloride. Likewise screw-lifts of similar diameter, having a height above the molten salt in the situation of an absorber as in FIGURES 5 and 6, of 16.6 inches, and a vertical extent of the double helical channel portion, below the salt level, of 16 inches, have permitted the attainment of high absorption efficiencies for substantial flows of gaseous aluminum trichloride, such screw-lifts being operated at approximately 700 r.p.m.

The invention has been described with respect to two illustrative but not limiting embodiments thereof. As will be apparent to those skilled in the art changes may be made in the precise form and arrangement of the parts without departing from the spirit and scope of the invention. Particularly, the combined means for contacting liquid and gas may find, in addition to the two embodiments described herein, embodiment in gas coolers, humidifiers, and other apparatus. All such modifications of the inventive principles are contemplated within the scope of the appended claims.

What is claimed is:

1. Apparatus for mixing and contacting a gas with a liquid, comprising a chamber having a lower liquid region adapted to contain said liquid and an upper gas region adapted to accommodate said gas over the surface of said liquid, said chamber having gas inlet and outlet means to provide traversal of gas through said upper gas region, and liquid spraying means located in the chamber for spraying liquid into the passing gas, said spraying means having a portion thereof within said lower liquid region and another portion thereof within said upper gas region, said liquid spraying means comprising a vertically disposed helical screw-lift adapted upon rotation thereof to lift liquid from the lower liquid region to the upper gas region and to release the liquid tangentially therein throughout the helical ascent thereof, and a concave member closely conforming to a limited arcuate portion of said helical screw-lift in the upper gas region portion thereof for returning into the screw-lift liquid moving therefrom in said limited arcuate portion thereof, said member being disposed to block release of liquid spray from said screw-lift in directions embraced within a predetermined solid angle having a vertical apex line adjacent the screw-lift.

2. Apparatus as defined in claim 1, wherein said arcuate portion has an extent in the range of 90° to 180°.

3. Apparatus as defined in claim 1, wherein said arcuate portion has an extent of about 135°.

4. Apparatus for mixing and contacting a gas with a liquid comprising a chamber having a lower liquid region adapted to contain said liquid and an upper gas region adapted to accommodate said gas over the surface of said liquid, said chamber having a gas inlet end and a gas outlet end for passage of gas through the upper gas region in a direction of path extending generally from inlet to outlet, and liquid spraying means located in the chamber intermediate said ends and having a portion thereof within said lower liquid region and another portion thereof within said upper gas region, said liquid spraying means comprising a vertically disposed helical screw-lift adapted upon rotation thereof to lift liquid from the lower liquid region to the upper gas region and to therein release the liquid tangentially throughout the helical ascent thereof, and a concave member closely conforming to a limited arcuate portion of said helical screw-lift in the upper gas region portion thereof, said member being disposed to block release of liquid spray from said screw-lift in directions toward said outlet end.

5. Apparatus as defined in claim 4, wherein said member is disposed and is arranged, with said arcuate portion selected to have an angular extent between 90° and 180°, to limit release of liquid spray from said screw-lift to regions within a solid angle having a vertical apex line adjacent the screw-lift, said solid angle being selected to include a spray region pointing generally toward the gas inlet and at least one spray region pointing crosswise of the aforesaid gas path.

6. Apparatus for mixing and contacting a gas with a liquid comprising a chamber having a lower liquid region adapted to contain said liquid and an upper gas region adapted to accommodate said gas over the surface of said liquid, said chamber having a gas inlet end and a gas outlet end; means defining a passageway out of said chamber at said gas outlet end; and liquid spraying means located at said gas outlet end adjacent said passageway and having a portion thereof within said lower liquid region and another portion thereof within said upper gas region, said liquid spraying means comprising a vertically disposed helical screw-lift adapted upon rotation thereof to lift liquid from the lower liquid region to the upper gas region and to therein release the liquid tangentially throughout the helical ascent thereof, and a concave member closely conforming to a limited arcuate portion of said helical screw-lift throughout the upper gas region portion thereof, said limited arcuate portion extending between a point on said helical screw-lift whose tangent points across the opening of said passageway and a point whose tangent points generally in the direction of said gas inlet.

7. Apparatus for mixing and contacting a gas with a liquid comprising a chamber having a lower liquid region adapted to contain said liquid and an upper gas region adapted to accommodate said gas over the surface of said liquid, said chamber having a gas inlet end and a gas outlet end; means defining a passageway out of said chamber at said gas outlet end; and liquid spraying means located at said gas outlet end adjacent said passageway and having a portion thereof within said lower liquid region and another portion thereof within said upper gas region, said liquid spraying means comprising a vertically disposed axially rotatable helical screw-lift having a helical upwardly open channel extending along the axial length thereof, said liquid spraying means being adapted upon rotation thereof to lift liquid from the lower liquid region to the upper gas region within said helical channel and to release the liquid tangentially throughout the helical ascent thereof in the upper gas region, and a concave member closely conforming to a limited arcuate portion of the outline of said helical screw-lift throughout the upper gas region portion thereof, said limited arcuate portion extending between a point on said helical screw-lift whose tangent points across the opening of said passageway and a point whose tangent points generally in the direction of said gas inlet.

8. Apparatus for mixing and contacting a gas with a liquid comprising a plurality of serially arranged chambers each having a lower liquid region adapted to contain said liquid and an upper gas region adapted to accommodate said gas over the surface of said liquid, each said chamber having a gas inlet end and a gas outlet end, the outlet end of one chamber connecting with the inlet end of the next chamber; means defining a passageway leading out of each said chamber at the gas outlet end thereof to the inlet end of the next chamber; and liquid spraying means located at each said gas outlet end adjacent the passageway associated therewith and having a portion thereof within said lower liquid region and another portion thereof within said upper gas region, said liquid spraying means comprising a vertically disposed axially rotatable helical screw-lift having a helical upwardly open channel extending along the axial length thereof, said liquid spraying means being adapted upon rotation thereof to lift liquid from the lower liquid region to the upper gas region within said helical channel and to release the liquid tangentially throughout the helical ascent thereof in the upper gas region, and a concave member closely conforming to a limited arcuate portion of the outline of said helical screw-lift throughout the upper gas region portion thereof, said limited arcuate portion extending between a point on said helical screw-lift whose tangent points across the opening of said passageway and a point whose tangent points generally in the direction of said gas inlet.

9. Apparatus for mixing and contacting a traversing gas with a molten liquid repository comprising a plurality of serially arranged chambers each having a lower liquid region adapted to contain said molten liquid and an upper gas region adapted to accommodate said traversing gas over the surface of said liquid, each said chamber having a gas inlet end and a gas outlet end, the outlet end of one chamber connecting with the inlet end of the next chamber; means defining a passageway leading out of each of said chamber at the gas outlet end thereof to the inlet end of the next chamber; means for introducing molten liquid into at least one of said chambers; means for withdrawing molten liquid from at least one of said chambers; and liquid spraying means located at each said gas outlet end adjacent the passageway associated therewith and having a portion thereof within said lower liquid region and another portion thereof within said upper gas region, said liquid spraying means comprising a vertically disposed axially rotatable helical screw-lift having a helical upwardly open channel extending along the axial length thereof, said liquid spraying means being adapted upon rotation thereof to lift liquid from the lower liquid region to the upper gas region within said helical channel and to release the liquid tangentially throughout the helical ascent thereof in the upper gas region, and a concave member closely conforming to a limited arcuate portion of the outline of said helical screw-lift throughout the upper gas region portion thereof, said limited arcuate portion extending between a point on said helical screw-lift whose tangent points across the opening of said passageway and a point whose tangent points generally in the direction of said gas inlet.

10. Apparatus for mixing and contacting a gas with a liquid comprising a chamber having a lower liquid region adapted to contain said liquid and an upper gas region adapted to accommodate said gas over the surface of said liquid, said chamber having a gas inlet end and a gas outlet end; means defining a passageway out of said chamber at said gas outlet end; and a pair of liquid spraying means located at said gas outlet end adjacent said passageway and arranged on either side of the opening thereof, a portion of each said liquid spraying means being within said lower liquid region and another portion thereof being within said upper gas region, said liquid spraying means each comprising a vertically disposed helical screw-lift adapted upon rotation thereof to lift liquid from the lower liquid region to the upper gas region and to therein release the liquid tangentially throughout the helical ascent thereof, and a concave member closely conforming to a limited arcuate portion of each said helical screw-lift throughout the upper gas region portion thereof, said limited arcuate portion extending between a point on said helical screw-lift whose tangent points across the opening of said passageway and a point whose tangent points generally in the direction of said gas inlet.

11. Apparatus for mixing and contacting a gas with a liquid comprising a chamber having a lower liquid region adapted to contain said liquid and an upper gas region adapted to accommodate said gas over the surface of said liquid, said chamber having a gas inlet end and a gas outlet end; means defining a passageway out of said chamber at said gas outlet end; and a pair of liquid spraying means located at said gas outlet end adjacent said passageway and arranged on either side of the opening thereof, a portion of each said liquid spraying means being within said lower liquid region and another portion thereof being within said upper gas region, said liquid spraying means each comprising a vertically disposed axially rotatable helical screw-lift having a helical upwardly open channel extending along the axial length thereof, each said liquid spraying means being adapted upon rotation thereof to lift liquid from the lower liquid region to the upper gas region within said helical channel and to release the liquid tangentially throughout the helical ascent thereof in the upper gas region, and a concave member closely conforming to a limited arcuate portion of the outline of each said helical screw-lift throughout the upper gas region portion thereof, said limited arcuate portion extending between a point on each said helical screw-lift whose tangent points across the opening of said passageway and a point whose tangent points generally in the direction of said gas inlet.

12. Apparatus for mixing and contacting a gas with a liquid comprising a plurality of serially arranged chambers each having a lower liquid region adapted to contain said liquid and an upper gas region adapted to accommodate said gas over the surface of said liquid, each said chamber having a gas inlet end and a gas outlet end, the outlet end of one chamber connecting with the inlet end of the next chamber; means defining a passageway leading out of each said chamber at the gas outlet end thereof to the inlet end of the next chamber; and a pair of liquid spraying means located at each said gas outlet end adjacent the passageway associated therewith and arranged on either side of the opening thereof, a portion of each said liquid spraying means being within said lower liquid region and another portion thereof being within said upper gas region, said liquid spraying means each comprising a vertically disposed axially rotatable helical screw-lift having a helical upwardly open channel extending along the axial length thereof, said liquid spraying means each adapted upon rotation thereof to lift liquid from the lower liquid region to the upper gas region within said helical channel and to release the liquid tangentially throughout the helical ascent thereof in the upper gas region, and a concave member closely conforming to a limited arcuate portion of the outline of each said helical screw-lift throughout the upper gas region portion thereof, said limited arcuate portion extending between a point on each said helical screw-lift whose tangent points across the opening of said passageway and a point whose tangent points generally in the direction of said gas inlet.

13. Apparatus for mixing and contacting a relatively hot traversing aluminum monohalide gas with a relatively cool molten aluminum liquid repository so as to cool said gas until decomposition into aluminum metal and aluminum trihalide is achieved comprising a plurality of serially arranged chambers each having a lower liquid region adapted to contain said molten aluminum liquid and an upper gas region adapted to accommodate said traversing aluminum monohalide gas over the surface of said liquid, each said chamber being lined with refractory material and having a gas inlet end and a gas outlet end, the outlet end of one chamber connecting with the inlet end of the next chamber; means defining a passageway leading out of each said chamber at the gas outlet end thereof to the inlet end of the next chamber; and liquid spraying means located at each said gas outlet end adjacent the passageway associated therewith and having a portion thereof within said lower liquid region and another portion thereof within said upper gas region, said liquid spraying means comprising a vertically disposed axially rotatable helical screw-lift having a helical upwardly open channel extending along the axial length thereof, said liquid spraying means being adapted upon rotation thereof to lift molten aluminum liquid from the lower liquid region to the upper gas region within said helical channel and to release the liquid tangentially throughout the helical ascent thereof in the upper gas region, and a concave member closely conforming to a limited arcuate portion of the outline of said helical screw-lift throughout the upper gas region portion thereof, said limited arcuate portion extending between a point on said helical screw-lift whose tangent points across the opening of said passageway and a point whose tangent points generally in the direction of said gas inlet.

14. Apparatus for mixing and contacting a relatively hot traversing aluminum monohalide gas with a relatively cool molten aluminum liquid repository so as to cool said gas until decomposition into aluminum metal and aluminum trihalide is achieved comprising a plurality of serially arranged chambers each having a lower liquid region adapted to contain said molten aluminum liquid and an upper gas region adapted to accommodate said traversing aluminum monohalide gas over the surface of said liquid, each said chamber being lined with refractory material and having a gas inlet end and a gas outlet end, the outlet end of one chamber connecting with the inlet end of the next chamber; means defining a passageway leading out of each said chamber at the gas outlet end thereof to the inlet end of the next chamber; and a pair of liquid spraying means located at each said gas outlet end adjacent the passageway associated therewith and arranged on either side of the opening thereof, a portion of each said liquid spraying means being within said lower liquid region and another portion thereof being within said upper gas region, each said liquid spraying means comprising a vertically disposed axially rotatable helical screw-lift having a helical upwardly open channel extending along the axial length thereof, each said liquid spraying means being adapted upon rotation thereof to lift molten aluminum liquid from the lower liquid region to the upper gas region within said helical channel and to release the liquid tangentially throughout the helical ascent thereof in the upper gas region, and a concave member closely conforming to a limited arcuate portion of the outline of each said helical screw-lift throughout the upper gas region portion thereof, said limited arcuate portion extending between a point on said helical screw-lift whose tangent points across the opening of said passageway and a point whose tangent points generally in the direction of said gas inlet.

15. Apparatus for mixing and contacting a relatively hot traversing aluminum monohalide gas with a relatively cool molten aluminum liquid repository so as to cool said gas until decomposition into aluminum metal and aluminum trihalide is achieved comprising a plurality of serially arranged chambers each having a lower liquid region adapted to contain said molten aluminum liquid and an upper gas region adapted to accommodate said traversing aluminum monohalide gas over the surface of said liquid, each said chamber being lined with refractory material and having a gas inlet end and a gas outlet end, the outlet end of one chamber connecting with the inlet end of the next chamber; means defining a passageway leading out of each said chamber at the gas outlet end thereof to the inlet end of the next chamber; means for introducing relatively cool molten liquid into each said chamber; means for withdrawing relatively hot molten liquid from each said chamber; and a pair of liquid spraying means located at each said gas outlet end adjacent the passageway associated therewith and arranged on either side of the opening thereof, a portion of each said liquid spraying means being within said lower liquid region and another portion thereof being within said upper gas region, each said liquid spraying means comprising a vertically disposed axially rotatable helical screw-lift having a helical upwardly open channel extending along the axial length thereof, each said liquid spraying mean being adapted upon rotation thereof to lift molten aluminum liquid from the lower liquid region to the upper gas region within said helical channel and to release the liquid tangentially throughout the helical ascent thereof in the upper gas region, and a concave member closely conforming to a limited arcuate portion of the outline of each said helical screw-lift throughout the upper gas region portion thereof, said limited arcuate portion extending between a point on said helical screw-lift whose tangent points across the opening of said passageway and a point whose tangent points generally in the direction of said gas inlet.

16. Apparatus for mixing and contacting a relatively hot traversing aluminum monohalide gas with a relatively cool molten aluminum liquid repository so as to cool said gas until decomposition into aluminum metal and aluminum trihalide is achieved comprising a plurality of serially arranged chambers each having a lower liquid region adapted to contain said molten aluminum liquid and an upper gas region adapted to accommodate said traversing aluminum monohalide gas over the surface of said liquid, each said chamber being lined with refractory material and having a gas inlet end and a gas outlet end, the outlet end of one chamber connecting with the inlet end of the next chamber; means defining a passageway leading out of each said chamber at the gas outlet end thereof to the inlet end of the next chamber; a pair of liquid spraying means located at each said gas outlet end adjacent the passageway associated therewith and arranged on either side of the opening thereof, a portion of each said liquid spraying means being within said lower liquid region and another portion thereof being within said upper gas region, each said liquid spraying means comprising a vertically disposed axially rotatable helical screw-lift having a helical upwardly open channel extending along the axial length thereof, each said liquid spraying means being adapted upon rotation thereof to lift molten aluminum liquid from the lower liquid region to the upper gas region within said helical channel and to release the liquid tangentially throughout the helical ascent thereof in the upper gas region, and a concave member closely conforming to a limited arcuate portion of the outline of each said helical screw-lift throughout the upper gas region portion thereof, said limited arcuate portion extending between a point on said helical screw-lift whose tangent points across the opening of said passageway and a point whose tangent points generally in the direction of said gas inlet; shroud means within said lower liquid region of at least one of said chambers and surrounding at least one of said liquid spraying means therein so as to define a minor liquid volume around that liquid spraying means and a major liquid volume within the rest of said liquid region; means for introducing relatively cool molten liquid into each said minor liquid volume; and means for withdrawing relatively hot molten liquid from each said major liquid volume.

17. Apparatus for mixing and contacting a traversing aluminum trihalide gas with a molten salt liquid in which the aluminum trihalide gas is soluble comprising a plurality of serially arranged chambers, one of said chambers constituting a final chamber and the preceding of said plurality of chambers constituting first to last spraying chambers, each said chamber having a lower liquid region adapted to contain said molten salt liquid and an upper gas region adapted to accommodate said traversing gas over the surface of said liquid, each said spraying chamber having a gas inlet end and a gas outlet end, the outlet end of one spraying chamber connecting with the inlet end of the next spraying chamber and the outlet end of the last spraying chamber connecting with said final chamber; means defining a passageway leading out of each said spraying chamber at the gas outlet end thereof to the inlet end of the next spraying chamber and from the outlet end of the last spraying chamber to the final chamber; liquid spraying means located at each said gas outlet end adjacent the passageway associated therewith and having a portion thereof within said lower liquid region and another portion thereof within said upper gas region, said liquid spraying means comprising a vertically disposed axially rotatable helical screw-lift having a helical upwardly open channel extending along the axial length thereof, said liquid spraying means being adapted upon rotation thereof to lift liquid from the lower liquid region to the upper gas region within said helical channel and to release the liquid tangentially throughout the helical ascent thereof in the upper gas region, and a concave member closely conforming to a limited arcuate portion of the outline of said helical screw-lift throughout the upper gas region portion thereof, said limited arcuate portion extending between a point on said helical screw-lift whose tangent points across the opening of said passageway and a point whose tangent points generally in the direction of said gas inlet; means in said first spraying chamber for the introduction of said gas in an enriched state and the withdrawal of said molten salt liquid in an enriched state; and means in said final chamber for the introduction of said molten salt in a lean state and the withdrawal of said gas in a lean state.

18. Apparatus according to claim 17 wherein the passageway between said last spraying chamber and said final chamber includes means for circulating said molten salt liquid within said final chamber and into said last spraying chamber.

19. Apparatus according to claim 17 wherein the passageway between said last spraying chamber and said final chamber extends down into said liquid region, the concave member closely conforming to the screw-lift associated with the last spraying chamber extends down into said liquid region and is curved around in the liquid region to communicate the liquid region portion of said associated screw-lift with the liquid region portion of said passageway, whereby the molten salt in said final chamber is drawn into said last spraying chamber.

References Cited by the Examiner

UNITED STATES PATENTS

| | | | |
|---|---|---|---|
| 2,038,221 | 4/1936 | Kagi | 266—34 X |
| 2,494,552 | 1/1950 | Mahler et al. | 261—91 X |
| 2,744,737 | 5/1956 | Van Vliet | 261—91 |
| 3,102,805 | 9/1963 | Messner | 75—68 |
| 3,240,590 | 3/1966 | Schmidt et al. | 266—34 X |

J. SPENCER OVERHOLSER, *Primary Examiner.*

E. MAR, *Examiner.*